UNITED STATES PATENT OFFICE.

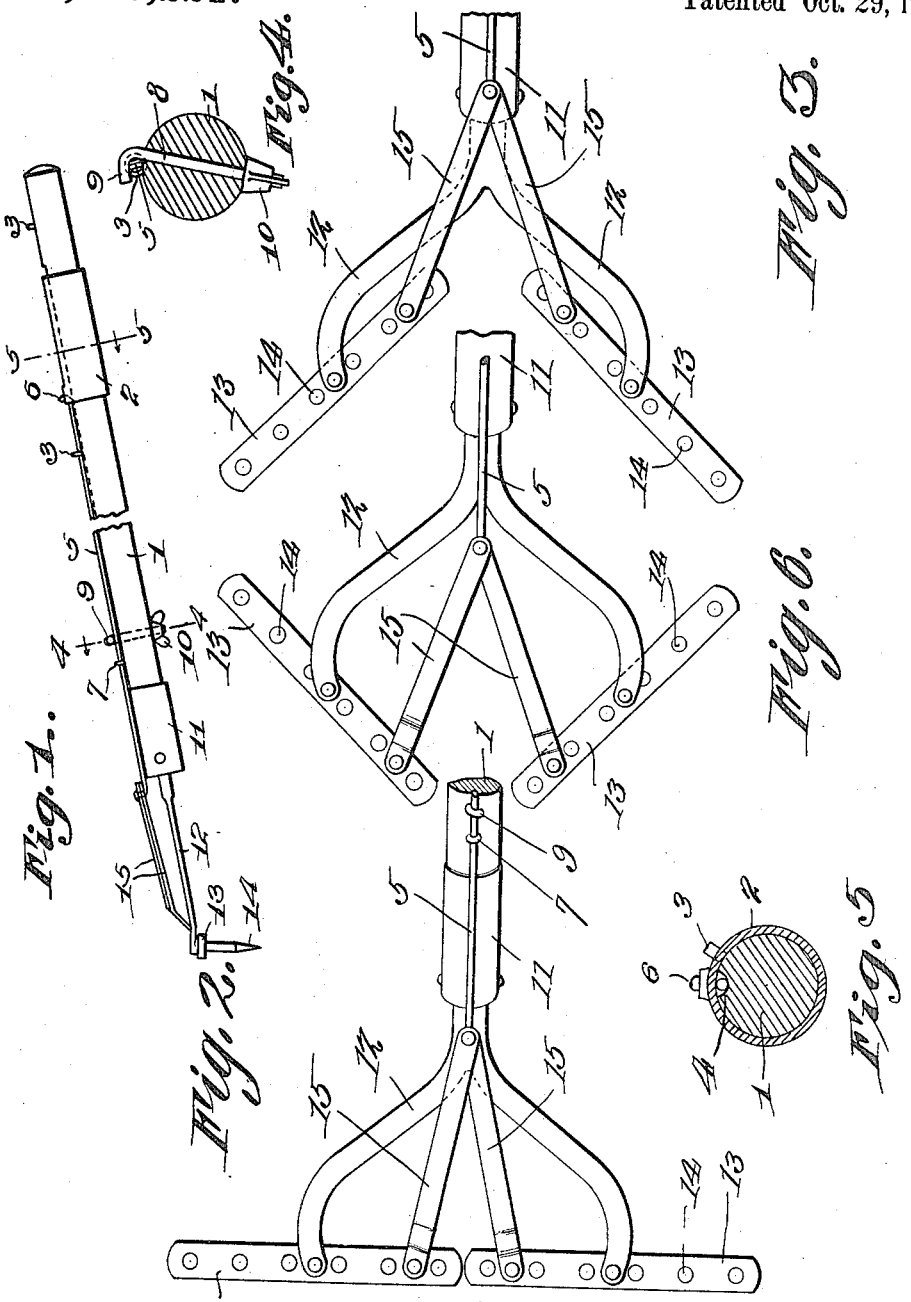

CHARLES EDWARD LANE, OF MAITLAND, FLORIDA.

AGRICULTURAL TOOL.

1,283,221.

Specification of Letters Patent.

Patented Oct. 29, 1918.

Application filed August 9, 1916. Serial No. 113,998.

*To all whom it may concern:*

Be it known that I, CHARLES E. LANE, a citizen of the United States, residing at Maitland, in the county of Orange and State of Florida, have invented a new and useful Agricultural Tool, of which the following is a specification.

This invention relates to agricultural tools and more particularly to a combined rake and harrow.

One of the objects of the invention is to provide a device of this character having tooth carrying members which can be readily adjusted relative to each other so as to permit the device to be used as an ordinary rake or as a cultivator for directing soil toward or away from plants.

A further object is to provide a structure of this character which is simple, durable and compact in construction and which can be manipulated in the same manner as an ordinary hand rake.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of the device.

Fig. 2 is a plan view thereof, a portion of the handle being removed.

Fig. 3 is a plan view of a portion of the device adjusted for use in directing loose soil outwardly against the rows.

Fig. 4 is an enlarged section on line 4—4 Fig. 1.

Fig. 5 is an enlarged section on line 5—5 Fig. 1.

Fig. 6 is a plan view of a portion of the device and showing the same adjusted for use as a harrow so that, when used between rows, the same will pull the soil away from the rows.

Referring to the figures by characters of reference 1 designates a handle of any suitable length and slidably mounted on this handle is a sleeve 2 which is limited in its movement by outstanding studs 3. The handle is formed for a portion of its length with a longitudinal groove 4 and in this groove is slidably mounted one end portion of a connecting rod 5, this rod having one terminal extending into the sleeve 2 and projecting through an aperture therein as shown at 6 whereby when the sleeve is shifted the rod will be moved therewith. A guide loop or staple 7 may be extended from the handle and is slidably engaged by the rod 5. For the purpose of holding the rod against movement, a bolt 8 may be extended through the handle, this bolt having a hooked end 9 which straddles the rod while the other end of the bolt is engaged by a wing nut 10 or the like. Thus by tightening the nut the hook 9 will be caused to bind upon the rod and hold said rod against movement.

A ferrule 11 is provided at one end of the handle and extending from said end of the handle are diverging arms 12 to the free end of each of which is secured the head 13 of a rake member. This head is provided with a longitudinal series of teeth 14 and the arms are so positioned and the heads so proportioned that under normal conditions the two heads can be held in alinement with each other and with their inner ends close together as shown in Fig. 2. Links 15 are connected to the inner ends of the heads and also to one end of the rod 5.

It will be understood that by pulling rod 5 in one direction along the handle 1, the links 15 will be caused to pull on the inner ends of the heads 13 and thus shift the heads to the position shown in Fig. 7 whereupon the tool can be used as a means for loosening the soil and for directing it against the rows of plants at the sides of the tool. By thrusting through rod 5 against the links 15 the heads 13 can be adjusted to the positions shown in Fig. 6 whereupon the tool can be used for loosening the soil and for drawing it away from the rows of plants at the sides thereof. When the parts are in the positions shown in Fig. 2 the device can be used as an ordinary garden rake. Obviously after the adjustment of the heads has been effected by shifting sleeve 2, the parts can be locked by tightening the nut 10 on the bolt 8.

What is claimed is:—

The combination with a handle and arms diverging from one end of the handle and unconnected at their outer ends, of heads pivotally connected between their ends to the free ends of the respective arms, the heads being movable into and out of alinement, the inner ends of the heads lying close together when in alinement, a rod slidably mounted on the handle, diverging links at one end of the rod and connected to the inner ends of the respective heads, a sleeve slidable on the handle and connected to the rod, and means extending through the handle and engaging the rod for binding the rod upon the handle to hold the rod and heads against movement.

In testimony that I claim the foregoing as my own, I have hereto affixed my signature in the presence of two witnesses.

CHARLES EDWARD LANE.

Witnesses:
J. H. TUCKER,
R. F. MAGUIRE.